March 7, 1939.  K. N. OGLE  2,149,897
TRIAL LENS
Filed April 27, 1936
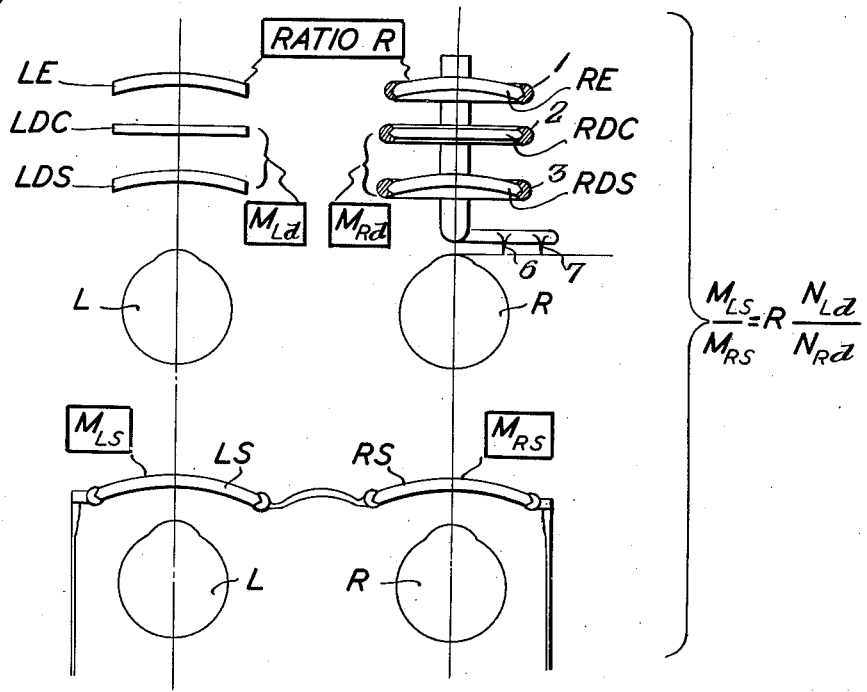
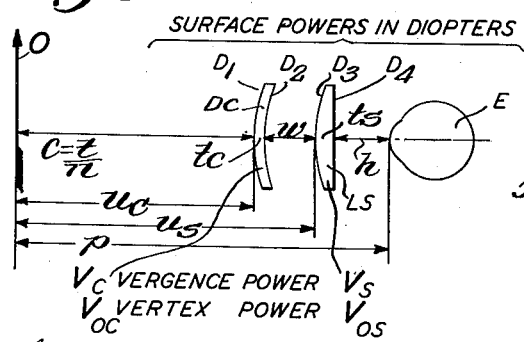
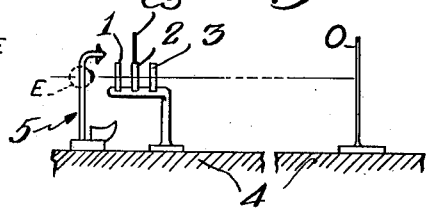
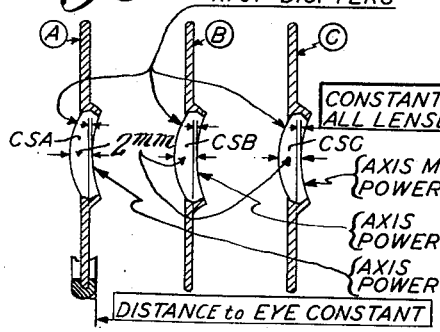
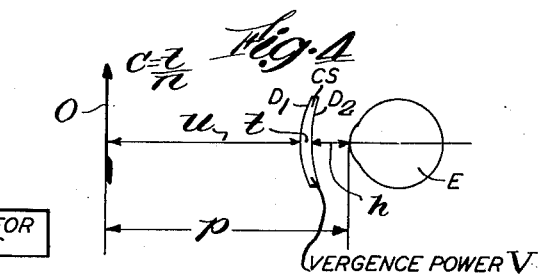
Inventor,
Kenneth N. Ogle,
by Roberts, Cushman & Woodberry Attys.

Patented Mar. 7, 1939

2,149,897

UNITED STATES PATENT OFFICE 2,149,897

TRIAL LENS

Kenneth N. Ogle, Hanover, N. H., assignor to Trustees of Dartmouth College, Hanover, N. H., a corporation of New Hampshire Application April 27, 1936, Serial No. 76,511

2 Claims. (Cl. 88—20)

The present invention deals with the correction of ocular defects involving not merely the dioptric or power conditions of the eyes, that is, distances between objects and images, but also incongruities of the respective patterns of the ocular images of a pair of eyes during binocular vision. The term ocular image as herein used describes the impression formed in the higher brain centers through the vision of one eye, which impression is determined not only by the properties of the dioptric image that is formed in the eye, but also by the modifications imposed thereupon by the anatomical properties and physiological processes by which this optical image is formed and carried to the higher brain centers.

More particularly, the invention deals with lens sets which permit the accurate and convenient determination and correction of the dioptric or power properties of an eye and which have characteristics making them especially suited for use in cases where the above-mentioned ocular image incongruities have to be taken into consideration.

It is the principal object of the invention to provide a test which permits the measuring of dioptric defects of an eye by means of a trial lens set by avoiding dimensional image changes inherently effected by heretofore known test lens systems.

In one of its aspects, the invention deals with lens sets with as many elements as combinations of overall and astigmatic power corrections are required, the elements being correlated in such a manner that all undesirable magnification defects are inherently eliminated. In another aspect, the invention provides the arrangement of a series of dioptric trial lenses of that type with lens positioning means which secure such lenses for the purpose of measuring dioptric defects without causing magnification effects which might complicate the subsequent prescription of spectacles for the correction of dioptric as well as ocular image incongruity conditions.

These and other objects, aspects and features of the invention will be apparent from the following detailed explanation illustrating its genus with reference to several embodiments thereof. The description refers to the drawing in which:

Figs. 1 and 2 indicate the dioptric and eikonic correction of a pair of eyes with trial lenses and equivalent spectacles;

Fig. 3 is a diagram indicating the optical data of a two lens system before an eye;

Fig. 4 is a similar diagram of a single lens system; and

Fig. 5 illustrates a trial lens set according to the present invention.

In order to gain an understanding of the problem of which the present invention presents a solution, and of that solution itself, it will be necessary to give a short outline of the determination and correction of dioptric and ocular image incongruity defects, as follows:

Referring to Fig. 1, the eyes L and R are tested with so-called eikonic lenses which correct all types of ocular image incongruities without substantially affecting the dioptric conditions of the eyes. Since the present invention is not particularly concerned with the details of such corrections, these test means are indicated by only a single eikonic lens, LE and RE, respectively, for each eye.

The dioptric defects have been usually corrected by means of spherical trial lenses LDS, RDS, and cylindrical lenses RDC, LDC in front thereof.

These lenses are placed in suitable means defining a predetermined distance between trial correction lenses and eyes. Such means are, for example, described in my copending application Serial No. 706,523, filed January 13, 1934, and herein indicated by lens holders 1, 2, 3 (Fig. 2) mounted on a support 4 suitably connected with a head rest 5 and sights 6, 7 (Fig. 1) for positioning the corneas in proper relation to the lens holders and test object O. It will be evident that other means may be used for the same purpose, as for example the customary adjustable trial lens frames.

It is obviously very convenient to be able to determine the combined effect of spherical and cylindrical trial lenses by merely adding powers marked on each particular lens.

As discussed in copending application Serial No. 67,557 filed March 6, 1936, the total vergence power for any given object distance is $$V_t = V_{os} + \frac{V_c S_{\infty}^2}{1 - V_c(w + S_{oc}c_s)} \quad (1)$$

where $$V_c = V_{oc} - \frac{S_{\infty}^2}{u_c + S_{\infty}c_c} \quad (2)$$

In these expressions, $V_t$ is the total vergence power effected by both lenses together, $V_{os}$ and $V_{oc}$ are the vertex powers of sphere and cylinders, respectively, and $V_c$ is the vergence power of the cylinder for the given object distance $u$ from the anterior surface. These values, as well as distance $u_c$, the separation $w$ of sphere and cylinder, $c_s$ and $c_c$, the reduced thicknesses of sphere and cylinder respectively, are indicated in Fig. 3.

It should be noted that, for finite object distance, power effects referred to the ocular lens surface are defined as the reciprocal of the image distance from that surface and herein termed vergence powers. For infinite object distance, vergence powers become vertex powers or back focal powers, herein distinguished by subscript "o".

$S_{os}$ and $S_{oc}$ are the shape magnification factors explained explained in the above copending application Serial No. 67,557 and depend upon the meniscus shape cupping or dishing of the lenses.

For infinite object distance, Formula (1) becomes $$V_{ot} = V_{os} + \frac{V_{oc}S_{os}^2}{1 - V_{oc}(w + S_{os}c_s)} \quad (3)$$

It will be evident that the marked powers of the two trial lenses will add up to the total power, for infinite object distance, if the spheres are marked with their $V_{os}$ values and the cylinders as having a power $V'_{oc}$ defined as follows:

$$V'_{oc} = \frac{V_{oc}S_{os}^2}{1 - V_{oc}(w + S_{os}c_s)} \quad (4)$$

This provides, for distant vision, the required additive relation $$V_{ot} = V'_{oc} + V_{os} \quad (5)$$

Formula (4) indicates that the lenses of such sets must be designed in such a way that $V'_{oc}$ is a function only of $V_{oc}$. In other words, all spheres must have the same $S_{os}$ and $c_s$, and $w$ must be constant. This means that all spheres must have the same front surface power and thicknesses, and that the axial separation of the test lens pairs must be constant.

Several of the trial case sets commercially available today are of this type.

It will now be apparent that the total power obtained by adding the marked powers of the trial lenses is strictly correct only for infinite distance. For tests at near (as reading) distance, these values must be corrected; however, this compensation is immaterial as far as the present invention is concerned and therefore not discussed herein.

After the proper eikonic and dioptric test lenses have been determined, the problem is to design spectacle lenses LS, RS which are substantially equivalent to these trial lenses with respect to power as well as magnification properties. Since the present invention is mainly concerned with magnification properties, only the magnification equivalency will be discussed.

The eikonic test lenses LE, RE determine in any given element of the visual field an eikonic correction ratio R. For any such element, the condition of equivalency, as far as dimensional image incongruities are concerned, is then $$\frac{M_{Ls}}{M_{Rs}} = R \frac{M_{Ld}}{M_{Rd}}$$

where $M_{Ls}$, $M_{Rs}$ are the magnifications of spectacle lenses LS and LR respectively, and $M_{Ld}$, $M_{Rd}$ the magnifications of the dioptric test lenses LDS, LDC and RDS, RDC, respectively.

As explained at length in the above-mentioned copending application, Serial No. 67,557—compare Formulas (13) and (3) of that application—the magnification of a two element lens system can be expressed as $$M = S_{os}S_{oc}TLP \quad (7)$$

where subscripts "c" and "s" of the "shape magnification" values indicate in the present instance that the cylindrical and spherical trial lenses represent the first and second lens elements, respectively, of the two element system.

It is therefore evident that, in order to determine the correct magnifications for the spectacle lenses, the magnifications introduced by the dioptric trial lenses must be carefully considered.

As likewise described in the above-identified application, factor P disappears because duplicated in the spectacles, provided that the distance $h$ between eye and ocular lens surface is the same in test and spectacle corrections. These relations are immaterial as far as the present invention is concerned and therefore not further discussed. Factor $S_{os}$ disappears if a dioptric trial set of the customary type is used, that is a set where all spheres have the same thickness, all cylinders have the same thickness, all spheres have the same front surfaces, all cylinders have the same front surfaces, and where the separation between all spheres and cylinders is constant.

Formula (6) becomes then $$\frac{M_{Ls}}{M_{Rs}} = R \frac{N_{Ld}}{N_{Rd}} = R \frac{S_{ocL}T_L L_L}{S_{ocR}T_R L_R} \quad (8)$$

The value N is referred to as "Spurious magnification" or "Cylindrical excess magnification", and its factors $S_{oc}$, T and L are defined as follows by the values indicated in Fig. 3:

$$S_{oc} = \frac{1}{1 - D_1 c_c} \quad (9)$$

$$T = \frac{1}{1 - V_c(w + S_{oc}c_s)} \quad (10)$$

$$L = \frac{p}{u_c + S_{oc}c_c} \quad (11)$$

Hence, the cylinder trial lens in front of the trial sphere introduces, for near vision, a spurious magnification $S_{oc}TL$ in the power and axis meridians; for distant vision, a spurious magnification $S_{oc}T$ is introduced in the power meridian. The following Table I gives spurious magnification values of certain cylinder elements of a conventional trial set. It will be noted that these values may be of magnitudes likely to change ocular image relations to a considerable degree.

TABLE I

Per cent spurious magnification values of a conventional trial lens set

| Cylinder power diopters | Near vision | | Distant vision | |
|---|---|---|---|---|
| | Power meridian | Axis meridian | Power meridian | Axis meridian |
| −1 | −.23 | −.13 | −.34 | .00 |
| −2 | −.57 | −.13 | −.67 | .00 |
| −3 | −.92 | −.13 | −1.00 | .00 |
| −4 | −1.28 | −.13 | −1.30 | .00 |

While the above-identified copending application Serial No. 67,557 provides ways for compensating the spurious magnification introduced by the conventional trial set, it is desirable to have test lenses which are inherently free of this effect and therefore simplify the computation of spectacle lenses which are equivalent to a given test correction.

A trial set according to my invention, which is inherently free of spurious magnification effects will now be described. This trial set is composed of single lenses each of which effects a complete spherical as well as cylindrical correction so that it is never necessary to employ two superposed power trial lenses in combination with the magnification lens.

As at length described in the above-identified copending application Serial No. 67,557, a single lens has the following magnification and power properties:

$$M = S_o L P \quad (12)$$

$$S_o = \frac{1}{1 - D_1 c} \quad (13)$$

$$L = \frac{p}{u + S_o c} \quad (14)$$

$$P = \frac{1}{1 - Vh} \quad (15)$$

$$V = V_o - \frac{S_o^2}{u + S_o c} \quad (16)$$

$$V_o = S_o D_1 + D_2 \quad (17)$$

The values occurring in these relations are indicated in Fig. 4. Shape magnification factor $S_o$ of the single lens CS depends only upon anterior surface $D_1$ and lens thickness. According to the present invention, all lens units of the set are ground with the same thickness and front surface power, so that $S_o$ is the same for all units.

Distance factor L depends only upon the position of the lens in relation to test object and eye and upon $S_o$ and the lens thickness. If the above conditions for keeping $S_o$ constant are observed, and in addition provisions are made, according to the invention, always to maintain constant distances $h$ and $u$ from lens to eye and test object respectively, L is also the same for all trial lenses. If lenses (one of which may have zero power) are always used before both eyes, the $S_o$ and L factors are under the stated condition always alike for both eyes and cancel therefore from Equation (8).

Factor P, the power magnification factor, is then dependent only upon the vergence power of the lens and distance $h$ of its ocular surface from the eye. Assuming that the latter distance is the same in the test and for the spectacle to be prescribed from the record of the test, and that the powers of spectacle and trial correction are the same, or, that different distances $h$ for trial correction and spectacles are compensated for by appropriately changed and related dioptric powers of the spectacle lenses (as mentioned above and explained in the above-identified copending application), P disappears from Equation (6). The values of $S_o$ and L being the same for all lenses, it will be apparent that my new trial lens series, if used as above explained, eliminates the effects of spurious magnification factors.

Fig. 5 illustrates by way of example three individuals of a trial set of this type which can be computed as follows:

Equation (17) can also be written as $$V_o = D_1 + D_2 + x \quad (18)$$

where $x$ is an allowance factor whose value is derived from Equations (17) and (18) as follows:

$$x = \frac{D_1^2 c}{1 - D_1 c} \quad (19)$$

$D_1$ is chosen arbitrarily, for example approximately 5 diopters, which gives a good field form. For $D_1$ approximately 5, $x$ is about 0.03.

Substituting the value $x = 0.03$ in Equation (19), and solving for $D_1$, the exact value of $D_1$ is obtained as $D_1 = +4.797$ diopters.

The values of ocular surfaces $D_2$ can now be computed for any desired meridian according to relation (18), as $$D_2 = V_o - D_1 - x = V_o - 4.827 \quad (20)$$

The following table identifies a trial set according to my invention, computed as above described. It will be understood that only a few elements are given, and that lenses for the conventional steps, say 0.25 diopter will be provided.

TABLE II

Powers $d_2$ of ocular surfaces, in the axis and power meridians, respectively, of the trial case lenses

| Axis meridian vertex powers; diopters | Cylinder meridian vertex powers; diopters | | | | | |
|---|---|---|---|---|---|---|
| | −6.00 | −4.00 | −2.00 | +2.00 | +2.00 | +6.00 |
| −6 | −10.827 | −10.827 | −10.827 | −10.827 | −10.827 | |
| | −10.827 | −8.827 | −6.827 | −2.827 | −0.827 | |
| −4 | | −8.827 | −8.827 (C) | −8.927 | −8.827 | |
| | | −8.827 | −6.827 | −2.827 | −0.827 | |
| −2 | | | −6.827 | −6.827 | −6.827 (B) | −6.827 |
| | | | −8.827 | −6.827 | −2.827 | −0.827 |
| 0 | | | −4.827 | −4.827 | −4.827 | −4.827 |
| | | | −8.827 | −6.827 | −2.827 | −0.827 |
| +2 | | | −2.827 | −2.827 | −2.827 | −2.827 |
| | | | −8.827 | −6.827 | −2.827 | −0.827 |
| +4 | | | −0.827 | −0.827 | −0.827 | −0.827 |
| | | | −8.827 | −6.827 | −2.827 | −0.827 |
| +6 | | +1.172 | +1.173 | +1.173 | +1.172 (A) | +1.173 |
| | | −8.827 | −6.827 | −2.827 | −0.827 | +1.173 |

In the above table, three units are marked (A), (B) and (C), respectively, which units are illustrated in Fig. 5. This figure also indicates the peculiar correlation of the units of the lens set, and the conditions of use. It will be noted that the anterior surface, lens thickness (that is value $t$ provided that all lenses are made of the same glass) and distance of ocular surface, from trial ring, and hence the distances of the ocular surfaces from the eyes, are the same for all units of the set.

When testing eyes with the present test set, it will often be preferable to apply initially only spherical lenses until a desirable spherical correction is found, whereupon astigmatic defects, if at all present, are determined by replacing the spherical elements with elements having the same spherical power but stepped cylindrical powers. By rotating these elements in their holders astigmatic axes and powers can be determined in otherwise conventional manner.

It will now be apparent that my invention provides a trial lens set for measuring dioptric power, which if used under the conditions herein stated excludes any magnification effects which might complicate the prescription of spectacles for the correction of power defects and ocular image incongruities indicated by a test correction comprising dioptric trial lenses from such a set.

It should be understood that the present disclosure is for the purpose of illustration only and that this invention includes all modifications and equivalents which fall within the scope of the appended claims.

I claim:

1. Apparatus for testing the eyes of a person for dioptric defects comprising means for holding two lens units before the respective eyes, means for substantially fixing the distances of said holding means from the eyes, and a set of lens units fitting said holding means for insertion thereinto, said set including several groups of lens units, the units of each group having one spherical surface and a torical second surface respectively, said surfaces being curved to effect the same power in one lens meridian of each unit of the group and powers stepped in certain prescription values in meridians normal to said first meridians, said powers in said first meridians being for different respective groups stepped in certain prescription power values, all units having the same thickness, the same surface curvatures of said first surfaces and means for equally distancing said second surfaces of said units from said holding means, any unit pair, if placed in said holding means with the second surfaces at said equal distances from from the eyes, providing spherical and cylindrical dioptric power effects constituting one of a series of ocular trial corrections, whereby any lens unit pair selected from said series as representing the desired dioptric correction of the eyes substantially excludes undesirable changes of the relative size of the ocular images.

2. In a multiple unit eye testing set, a series of lens mountings, and fixed therein a series of test lenses for selective positioning of a single lens before each eye of a patient, said series including several groups of lenses, the lenses of each group having a spherical front surface and a torically concave ocular surface respectively, said surfaces being curved to effect the same power in one meridian of each lens and powers stepped in certain prescription values in meridians normal to said first meridians, said powers in said first meridians being for different respective groups stepped in certain prescription power values, all lenses having the same thickness, the same front curvatures and means for equally distancing the ocular surfaces of said lenses from said mountings, any lens pair, if placed with said mountings at equal distances from the eyes, providing spherical and cylindrical dioptric power effects constituting one of a series of ocular trial corrections, whereby any lens pair selected from said series as representing the desired dioptric correction of the eyes substantially excludes undesirable changes of the relative size of the ocular images.

KENNETH N. OGLE.